United States Patent
Liu et al.

(10) Patent No.: US 10,536,368 B2
(45) Date of Patent: Jan. 14, 2020

(54) NETWORK-AWARE ROUTING IN INFORMATION CENTRIC NETWORKING

(71) Applicant: FUJITSU LIMITED, Kawasaki-shi, Kanagawa (JP)

(72) Inventors: Lei Liu, San Jose, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 23 days.

(21) Appl. No.: 15/603,435

(22) Filed: May 23, 2017

(65) Prior Publication Data

US 2018/0343194 A1    Nov. 29, 2018

(51) Int. Cl.
*H04L 12/707* (2013.01)
*H04L 12/715* (2013.01)
*H04L 12/749* (2013.01)

(52) U.S. Cl.
CPC ............ *H04L 45/22* (2013.01); *H04L 45/64* (2013.01); *H04L 45/741* (2013.01)

(58) Field of Classification Search
CPC ............ H04L 67/327; H04L 67/2842; H04L 67/1097; H04L 69/22; H04L 45/745
See application file for complete search history.

(56) References Cited

U.S. PATENT DOCUMENTS

| | | | |
|---|---|---|---|
| 2014/0173018 A1* | 6/2014 | Westphal | H04L 41/0823 709/213 |
| 2016/0119194 A1* | 4/2016 | Valencia Lopez | H04L 41/50 709/223 |
| 2016/0149810 A1* | 5/2016 | Liu | H04L 12/6418 370/392 |

OTHER PUBLICATIONS

L. Zhang, et al., "Named Data Networking," ACM Computer Communication Review, vol. 44, No. 3, pp. 66-73, Jul. 2014.
Vince Lehman, et al., "A Secure Link State Routing Protocol for NDN" NDN technical report NDN-0037, Jan. 26, 2016.
A. Afanasyev, et al., "Map-and-Encap for Scaling NDN Routing," NDN technical report NDN-0004, Jan. 8, 2015.
A K M Mahmudul Hoque, et al., "NLSR: Named-data Link State Routing Protocol," ICN'13, Aug. 12, 2013.

* cited by examiner

*Primary Examiner* — Jamal Javaid
(74) *Attorney, Agent, or Firm* — Maschoff Brennan

(57) ABSTRACT

The present disclosure includes a method of routing packets. The method may include receiving, at a network device, an interest packet that requests content from an ICN network, where the network device is configured to communicate in the ICN network via one or more paths in an address-routing network. In the method, the ICN network may be overlaid on one or more network devices communicating in the address-routing network. The method may additionally include determining, between a first and second alternative path, a routing path of where to route the interest packet based on network costs associated with obtaining the content along each of the first and the second alternative paths through the address-routing network. The method may also include sending the interest packet along the routing path.

20 Claims, 7 Drawing Sheets

NETWORK-AWARE ROUTING IN INFORMATION CENTRIC NETWORKING

FIELD

The embodiments discussed herein are related to network-aware routing in information centric networking (ICN).

BACKGROUND

The Internet is currently based on address-routing networks, such as Internet Protocol (IP) networks, with a frame of reference of where content is located, for example, at a given IP address. In ICN networks, the frame of reference is based on what content is requested, rather than where the content is located. Examples of ICN networks may include content-centric networking (CCN) networks and named-data networking (NDN) networks.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure may include a method of routing packets. The method may include receiving, at a network device, an interest packet that requests content from an ICN network, where the network device is configured to communicate in the ICN network via one or more paths in an address-routing network. In the method, the ICN network may be overlaid on one or more network devices communicating in the address-routing network. The method may additionally include determining, between a first and second alternative path, a routing path of where to route the interest packet based on network costs associated with obtaining the content along each of the first and the second alternative paths through the address-routing network. The method may also include sending the interest packet along the routing path.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
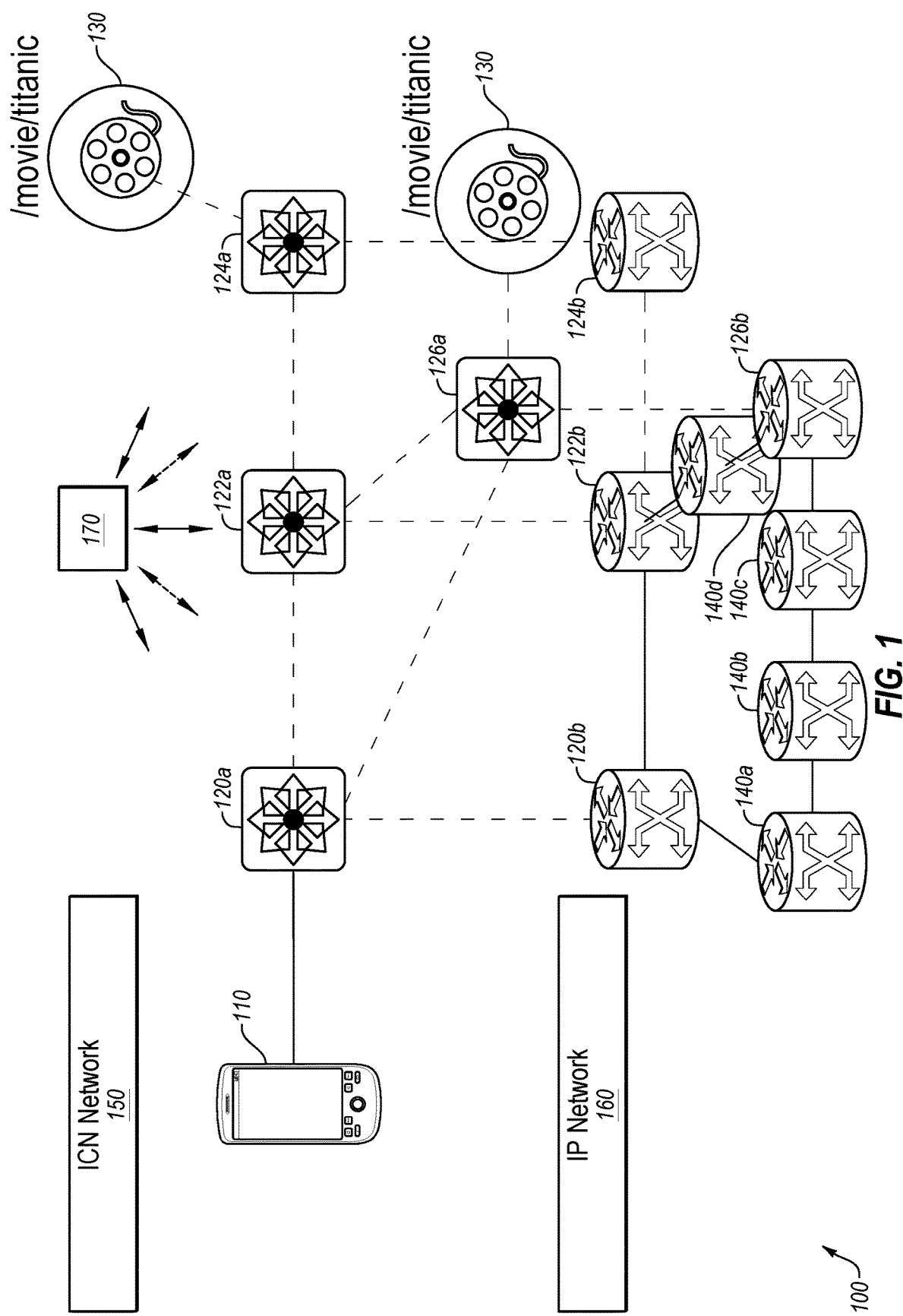
FIG. 1 is a diagram representing an example information centric networking (ICN) network related to network-aware routing of packets.

The present disclosure relates to network-aware routing of interest packets in an information centric networking (ICN) network. In a complete ground-up ICN network, default forwarding rules of interest packets may be efficient. However, because of the prevalence of Internet Protocol (IP) networks, the existence of complete ground-up ICN networks may be uncommon. A more practical implementation may be an ICN network overlaid on an IP network. For example, one or more IP network devices in an IP network may also be in communication with ICN network devices. An example system of an ICN network overlaid on an IP network is illustrated in FIG. 1. The ICN network devices may be implemented as virtual machines on the same hardware as the IP network devices, or may be otherwise communicatively coupled to the IP network devices. The ICN network devices may utilize a tunnel or other IP communication as the outgoing ports over which the ICN network devices communicate. However, because traditional ICN network devices are unaware of the topology of the underlying IP network, the ICN network packets may be routed in an inefficient manner.

The present disclosure may relate to routing decisions for packets in the ICN network that account for network costs of various paths through the underlying IP network. For example, the ICN network devices may query the costs for multiple paths to a next network device, and may elect to route the packet along the less costly path. As used herein, the term "cost" may refer to any number of metrics or representations of network performance. For example, cost may include a number of hops between network devices, jitter, latency, loss, bandwidth, price of network usage, and/or others, or any combinations thereof. Additionally, the terms "low cost path," "less costly path," "least costly path," and/or other similar terms may include a lowest cost path among paths considered, a cost for a path below a threshold, not the highest cost path, or any other relative metric to designate a path that is more efficient than another path.

In the present disclosure, a packet requesting content may be referred to as an interest packet, and a packet providing content requested by an interest packet may be referred to as a content packet.

In the present disclosure, reference may be made to an IP network, or IP network devices. Such a reference may include any address-routing network using any protocol that routes packets or operates based on where content is located. Additionally, an ICN network may include any network or protocol that operates based on the name of content rather than an address of the content.

Embodiments of the present disclosure are explained with reference to the accompanying drawings.

FIG. 1 is a diagram representing an example system 100 operating an ICN network 150, according to one or more embodiments of the present disclosure. The system 100 may include an end user 110, one or more ICN network devices 120a, 122a, 124a, and 126a operating in the ICN network 150, and overlaid on one or more IP network devices 120b, 122b, 124b, and 126b operating in an IP network 160. The system 100 may additionally include other IP network devices, such as IP network devices 140a, 140b, 140c, and 140d that do not include an ICN network device overlaid thereon. The system 100 may additionally include content 130 that may be requested by an interest packet, and may also include a centralized device 170. While the ICN network 150 may have packets, such as interest packets and content packets, routed through the ICN network 150 according to default rules, in some embodiments the ICN network devices 120a, 122a, 124a, and 126a may route packets in a manner that deviates from the default rules.

In operation, the end user 110 may request the content 130 from the ICN network device 120a via an interest packet. The ICN network device 120a may determine that the content 130 is not stored at the ICN network device 120a and that the interest packet is to be forwarded on through the ICN network 150. However, the physical topology of the ICN network 150 may be different from the physical topology of the IP network 160. The differences in topology may cause the default rules of the ICN network device 120a to forward the interest packet in an inefficient manner. For example, for the content 130, the ICN network device 120a may recognize that the content 130 is not stored on the neighboring ICN network device 122a and would have to traverse one or more additional hops (e.g., to the ICN network device 124a) in order to access the content 130. Additionally, the ICN network device 120a may recognize that the content 130 is also stored on the neighboring ICN network device 126a. If operated according to default rules, the interest packet is sent to the ICN network device 126a rather than 124a to fetch the content 130 as the cost to the ICN network device 126a is smaller in the ICN network 150 than the cost to the ICN network device 124a. However, the packet is physically transmitted in the underlying IP network 160. In the underlying IP network 160, the path to the content 130 may include two hops through the underlying IP network 160 (120b to 122b, and 122b to 124b) when routed to the ICN network device 124a, while the path to the content 130 may include three hops (120b to 122b, 122b to 140d, and 140d to 126b) or even four hops (120b to 140a, 140a to 140b, 140b to 140c, and 140c to 126b) when routed to the ICN network device 126a. Thus, if operated according to default rules, such as sending interest packets to the first known ICN network device 126a that is storing the content 130, or routing based on costs in the ICN network 150, the packets may take an inefficient route because of the underlying topology of the IP network 160.

The present disclosure may provide for the ICN network device 120a to forward the interest packet by accounting for the topology of the IP network 160 underlying the ICN network 150. Various examples of how the ICN network device 120a may account for the topology of the IP network 160 are described with reference to FIGS. 3-6.

The end user 110 may include any device, system, component, or collection of components configured to request the content 130 from a remote device. The end user 110 may be implemented as a computer (such as a desktop, laptop, server, and/or others), as a mobile device (such as a cellular telephone, personal digital assistant (PDA), tablet, and/or others), or as any other device connected to a network (such as a network-enabled thermostat, refrigerator, or other appliance). By way of example, during operation in the system 100, the end user 110 may send an interest packet to the network device 120a. Because the ICN network 150 is an ICN network, the interest packet may not indicate where the desired content 130 is located, but instead may name the content 130 desired by the end user 110. The content 130 illustrated includes /movie/titanic.

The ICN network devices 120a, 122a, 124a, and 126a may include any device, system, component, or collection of components configured to receive, handle, and/or process packets within the ICN network 150. The ICN network devices 120a, 122a, 124a, and 126a may each be implemented as a router, a gateway, a switch, or any other network element. In some embodiments, the ICN network devices 120a, 122a, 124a, and 126a may be implemented as a virtual machine or other software implementation running on the physical hardware of the IP network devices 120b, 122b, 124b, and 126b, respectively. The ICN network devices 120a, 122a, 124a, and 126a may each include one or more interfaces, e.g., one or more physical and/or logical entrance or exit points for communication with a network device, such as ports. In some embodiments, such entrance or exit points may include virtual exit points such as tunnels through the IP network 160. For example, the ICN network device 120a may include a first interface connecting to the end user 110, a second interface connecting to the ICN network device 122a through an IP tunnel that traverses the IP network devices 120b and 122b, and a third interface connecting to the ICN network device 126a through an IP tunnel that traverses the IP network devices 120b, 140a, 140b, 140c, and 126b.

In some embodiments, the ICN network device 120a may include a communication link with the IP network device 120b. For example, the ICN network device 120a may be configured to submit one or more queries to the IP network device 120b regarding the topology, performance, or other network characteristic of the IP network 160.

In some embodiments, the ICN network devices 120a, 122a, 124a, and 126a may each include a content store, a pending interest table (PIT), and a forwarding information base (FIB). The content store, PIT, and FIB may each include physical or logical storage components or locations within the memory and/or the storage media of the ICN network devices 120a, 122a, 124a, and 126a. An example of an operation/structure/information in a content store, a PIT, and a FIB are now explained with respect to the ICN network device 120a, but may apply to the ICN network devices 122a, 124a, and 126a. In these and other embodiments, a content store may operate as a storage location for the ICN network device 120a to store content which has been requested by another device in the ICN network 150. By using the content store, content that is frequently requested may be located in the content stores of multiple network devices and may be provided to a device requesting the content more quickly and/or efficiently.

In some embodiments, the PIT may serve as a status indicator of what interest packets have been received by the network device for which the network device is still awaiting a content packet. For example, the PIT may have table entries associating requested content with interfaces of the network device that have received interest packets requesting the content. The PIT may be used when a content packet is received by the network device to identify if that content has been requested and which interfaces have requested that content so the content packet may be sent out from the network device on the requesting interfaces.

In some embodiments, the FIB may include a database, set of rules, protocols, or the like by which the network device may determine where to forward an interest packet when received by the network device. For example, when an interest packet is received at the network device, the FIB may be utilized to determine which interface or interfaces of the network devices are used to transmit the interest packet to request the content. An example of a content store, a PIT, and a FIB may also be illustrated in FIG. 2.

In some embodiments, the FIB may be updated to include information regarding network costs associated with various paths through the IP network 160. For example, the ICN network device 120a may obtain network costs associated with the underlying IP network 160 when sending a packet to another ICN network device. Such an approach may be in contrast to default rules of maintaining the FIB.

The operation of the ICN network device 120*a* is now described when operating under default rules. The ICN network devices 122*a*, 124, and 126*a* may operate according to the same principles as described with respect to the ICN network device 120*a*.

For example, when the ICN network device 120*a* receives an interest packet (for example, from the end user 110 or another ICN network device 122*a*), the ICN network device 120*a* may check if the interest packet is requesting content already stored in the content store of the ICN network device 120*a*. If the content is in the content store of the ICN network device 120*a*, the ICN network device 120*a* may send the content in a content packet back over an interface through which the interest packet was received. For example, as shown in FIG. 1, the interest packet may be sent from the end user 110 and received by the ICN network device 120*a* at an interface and the content packet may be sent back out over that interface connecting the end user 110 to the ICN network device 120*a*. If the content is not in the content store of the ICN network device 120*a*, the ICN network device 120*a* may check the PIT of the ICN network device 120*a* to determine if there is an existing entry for the name of the content which has been previously requested by other interest packets. If there is no entry, the ICN network device 120*a* may create an entry for the interest packet in the PIT. The entry for the PIT may include the name of the content requested and the interface over which the interest packet was received. If there is an entry in the PIT for the interest packet, the ICN network device 120*a* may update the entry for the interest packet to also include the interface over which the interest packet was received. For a new entry in the PIT, the ICN network device 120*a* may forward the interest packet according to the rules in the FIB. For example, the rules in the FIB may follow a Named Data Link State Routing (NLSR) protocol or other routing protocols used in ICN networks. Forwarding the interest packet may cause the interest packet to be forwarded to one interface or multiple interfaces. Using ICN default rules, a single interest packet may be sent for content, and any additional interest packets requesting the same content may simply update the PIT entry. Also, one interest packet on an interface may result in one content packet being sent over the same interface.

As another example, when the ICN network device 120*a* receives a content packet, the ICN network device 120*a* may check the PIT to determine whether it has an entry in the PIT for the name of the content in the content packet. If there is no entry for the content, the ICN network device 120*a* may discard the content packet. If there is an entry in the PIT for the name of the content in the content packet, the ICN network device 120*a* may store the content of the content packet in the content store and may then transmit the content packet out to each of the interfaces in the PIT entry associated with the name of the content in the content packet. As described above, interest packets may have been received on multiple interfaces requesting the content. After the content packets have been sent, the ICN network device 120*a* may remove the entry in the PIT for the content.

According to the default rules, an interest packet is forwarded to the first interface in the corresponding FIB entry. For example, according to the FIB table in FIG. 2, if an interest packet requesting a content /fujitsu.com/xxx, according to the default forwarding rule, the interest packet will be forwarded to the interface 0. The default rule for maintaining FIBs accounts for costs in the ICN network 150. For example, using an ICN network routing protocol (such as NLSR), ICN network devices are able to advertise the content information in the ICN network 150. When an ICN network device receives this advertisement, the ICN network device updates the FIB accordingly, and may rank the interfaces based on the cost through the ICN network to the content. For example, if an ICN network device receives two advertisements for the content /fujitsu.com, from both faces 0 and 1, the ICN network device will add both faces in the FIB, and the face with smaller cost (e.g. face 0) will be put in front of the face with larger cost (e.g. face 1) in the FIB entry.

In some embodiments, the FIB may be updated to include information regarding network costs associated with various paths through the IP network 160. For example, the ICN network device 120*a* may obtain network costs associated with the underlying IP network 160 when sending a packet to another ICN network device. Additionally or alternatively, the ICN network device 120*a* may receive various status messages or other updates from other ICN network devices such as neighboring ICN network devices (e.g., the ICN network devices 122*a* and 126*a* may be neighboring to the ICN network device 120*a*), and may query costs associated with a route to the neighboring ICN network devices. Such costs may be reflected or otherwise stored in the FIB of the ICN network device 120*a* such that when the ICN network device 120*a* goes to route an interest packet on through the ICN network 150, the FIB reflects the costs associated with the underlying IP network 160 such that an efficient or low cost path may be selected.

In some embodiments, the ICN network device 120*a* may query the centralized device 170 to ascertain where the content 130 is located, and may query the underlying IP network device 120*b* to ascertain the cost associated with routing the interest packets to the various locations identified by the centralized device 170. In such an embodiment, the centralized device 170 may be implemented as a domain name system (DNS) server or other system to provide similar functionality of receiving a textual name and returning an address. For example, the ICN network device 120*a* may send the interest packet to the centralized device 170 that includes the name of the content requested. The centralized device 170 may perform a lookup to match ICN network devices and/or underlying IP network devices of where the content identified in the interest packet is stored. The centralized device 170 may then send a communication back to the ICN network device 120*a* identifying the location of the content. In some embodiments, the location may include an IP address that may be passed to the underlying IP network device 120*b* to determine costs to the location. Additionally or alternatively, the location may include an ICN network device and the FIB may be updated to reflect interfaces that direct packets towards such ICN network devices.

In some embodiments, the ICN network device 120*a* may send the interest packet to the centralized device 170, and the centralized device may maintain a representation of where content is stored, and topologies of the ICN network 150 and the underlying IP network 160. The centralized device 170 may additionally or alternatively store cost information associated with various paths through the IP network 160. In response to receiving the interest packet, the centralized device 170 may determine a low cost path to route the interest packet to where the requested content is stored. Additionally or alternatively, the centralized device 170 may transmit a message back to the ICN network device

120*a* identifying an interface over which the ICN network device 120*a* may be instructed to route the interest packet. In these and other embodiments, the message sent back to the ICN network device 120*a* may update or otherwise modify the FIB of the ICN network device 120*a*. In these and other embodiments, the centralized device 170 may include a software defined network (SDN) controller or other centralized control device that monitors and maintains a storage of the topology of the networks 150 and 160 and of where various content is stored.

Modifications, additions, or omissions may be made to FIG. 1 without departing from the scope of the present disclosure. For example, the ICN network 150 may include more or fewer elements with more or fewer connections than those illustrated and described in the present disclosure. For example, the ICN network 150 may include many more ICN network devices and end users arranged in any topology. As another example, the IP network 160 may include more or fewer elements with more or fewer connections than those illustrated. The relatively small number of network nodes and simple topologies illustrated in FIG. 1 are merely for ease in understanding the concepts of the present disclosure.

Figure 2:
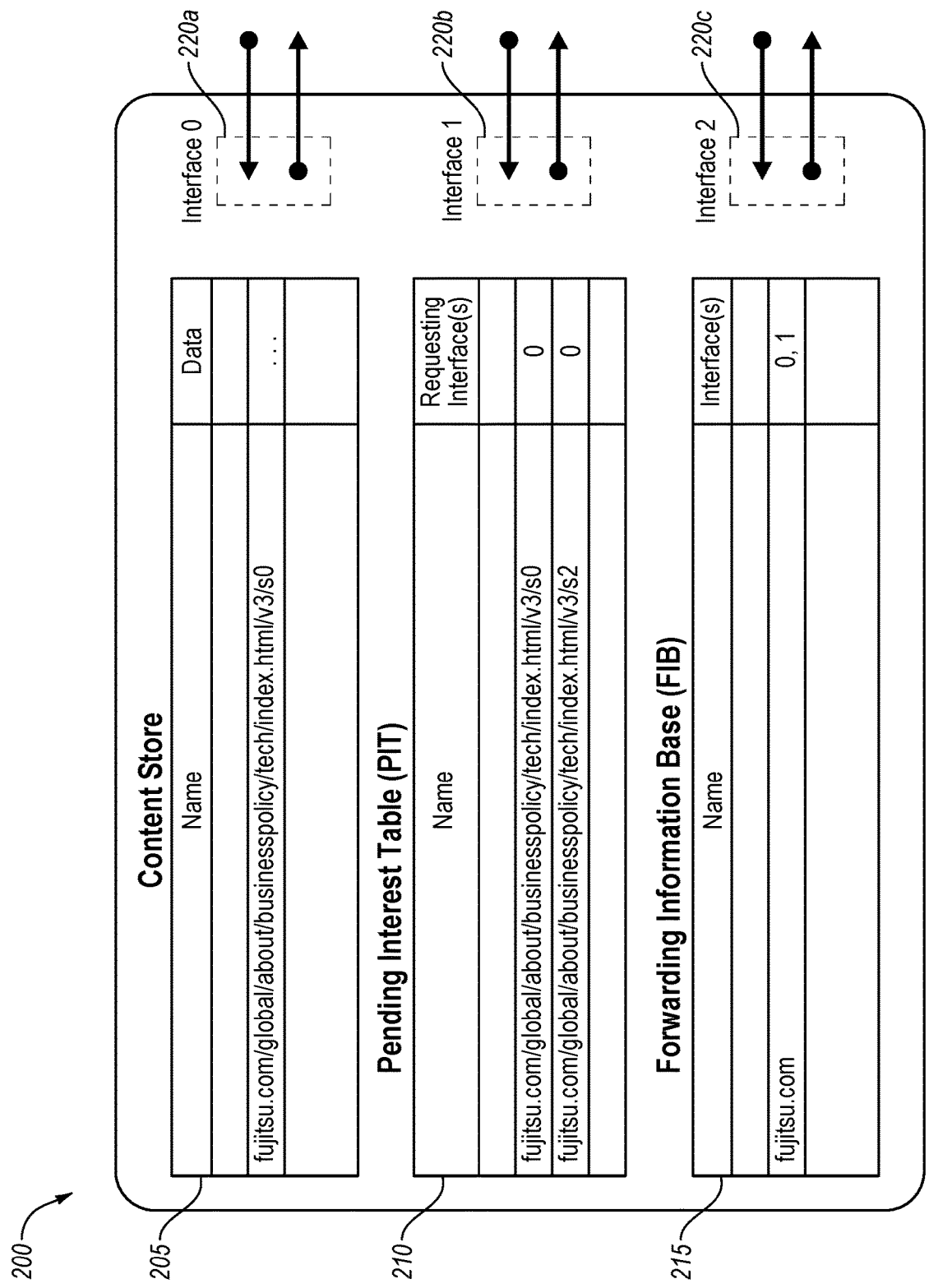
FIG. 2 is an example diagram of various tables within a network device.

FIG. 2 is an example diagram of various tables within an ICN network device 200, according to one or more embodiments of the present disclosure. The network device 200 may include a content store 205, a PIT 210, a FIB 215, and interfaces 220*a* (Interface 0), 220*b* (Interface 1), and 220*c* (Interface 2). Each of these components may be implemented as described with respect to FIG. 1. For example, when an interest packet is received at the network device 200 at the interface 220*a*, the network device 200 may determine if the content requested in the interest packet is stored in the content store 205. If the content is in the content store 205, the network device 200 may send the content back through the interface 220*a* in a content packet. If the content is not stored there, the network device 200 may updated the PIT 210 to include the interest packet. Updating the PIT 210 may include generating a new entry in the PIT 210 if no entry exists for the content or adding the interface 220*a* to the PIT entry if there is an existing PIT entry for the requested content. When sending an interest packet, the network device 200 may forward the interest packet according to the FIB 215, which may operate (e.g. may be automatically updated) according to the NLSR protocol or other ICN routing protocols.

FIGS. 3-6 include flowcharts of example methods 300, 400, 500, and 600, respectively, of network aware routing in an ICN network, according to one or more embodiments of the present disclosure. The methods 300, 400, 500, and 600 may be performed by any suitable system, apparatus, or device. For example, the system 100, the ICN network 150, the ICN network devices 120*a*, 122*a*, 124*a*, 126*a*, and/or the centralized device 170 of FIG. 1, and/or the computing system 700 of FIG. 7 may perform one or more of the operations associated with one or more of the methods 300, 400, 500, and 600.

Additionally, modifications, additions, or omissions may be made to the methods 300, 400, 500, and/or 600 without departing from the scope of the present disclosure. For example, the operations of the methods 300, 400, 500, and/or 600 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

In some embodiments, various steps related to determining whether an ICN network device has content requested in an interest packet stored in its content store, or whether its PIT indicates that an interest packet has already been routed further on through an associated ICN network, may be omitted. For example, after receiving an interest packet, an ICN network device may satisfy those two queries before deciding to route an interest packet further on through the ICN network. In some embodiments, a determination of where to route the interest packet may be performed based on a determination that the content store does not contain the requested content, and a determination that the PIT does not have an entry for the content.

Figure 3:
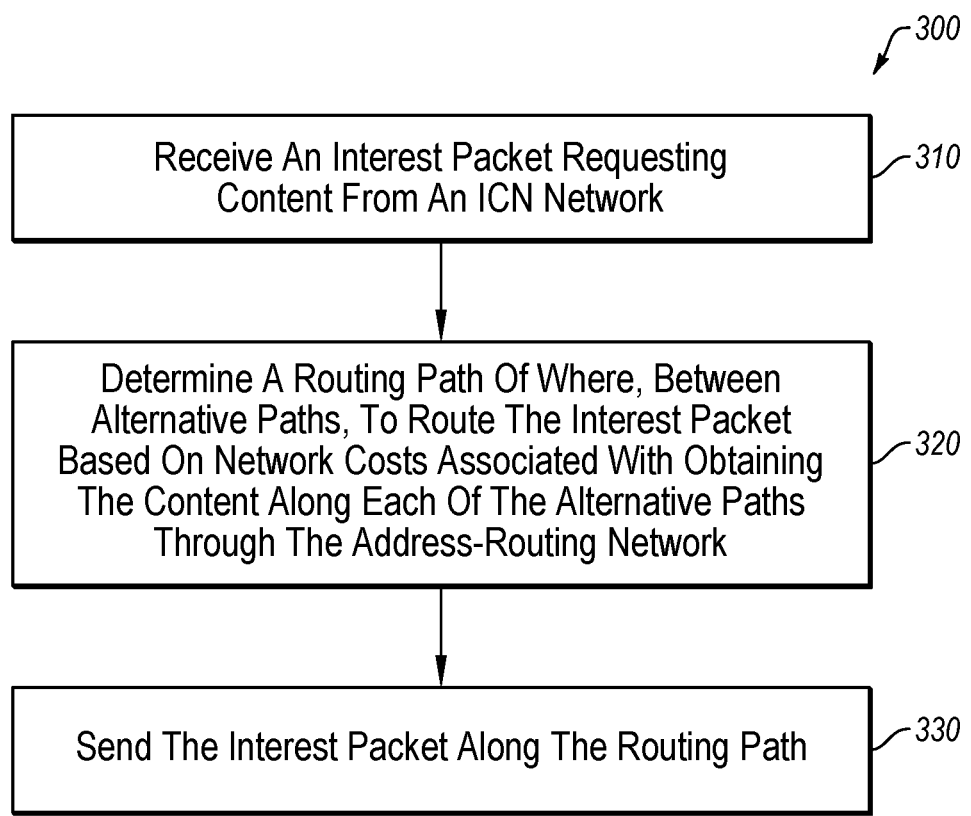
FIG. 3 is a flowchart of an example method of network-aware routing in an ICN network.

With reference to the method 300 of FIG. 3, at block 310, an interest packet requesting content from an ICN network may be received at an ICN network device, where the ICN network may be overlaid on network devices that communicate in an address-routing network. For example, an end user (such as the end user 110 of FIG. 1) may send an interest packet to an ICN network device (such as the ICN network device 120*a* of FIG. 1). The ICN network device may be part of an ICN network (such as the ICN network 150 of FIG. 1) that is overlaid on the address-routing network (such as the IP network 160 of FIG. 1). For example, the ICN network devices (such as the ICN network devices 120*a*, 122*a*, 124*a*, and 126*a* of FIG. 1) may be coupled to address-routing network devices (such as the IP network devices 120*b*, 122*b*, 124*b*, and 126*b* of FIG. 1) such that the ICN network devices may route packets to other ICN network devices via the address-routing network, such as through tunnels of an IP network.

At block 320, a determination may be made as to where, between multiple alternative paths, to route the interest packet, and may be referred to as a routing path. Such a determination may be based on network costs associated with obtaining the content along the various alternative paths through the underlying address-routing network. For example, the ICN network device may query the underlying address-routing network device to determine the network costs for sending a packet along the various paths through the address-routing network. As another example, the ICN network device may query a centralized device (such as the centralized device 170 of FIG. 1) to determine where the interest packet should be routed. Based on which of the multiple paths is a low cost path, the low cost path may be selected as the routing path.

At block 330, the interest packet may be sent along the routing path, which may traverse at least a portion of the address-routing network and arrive at a next ICN network device.

Figure 4:
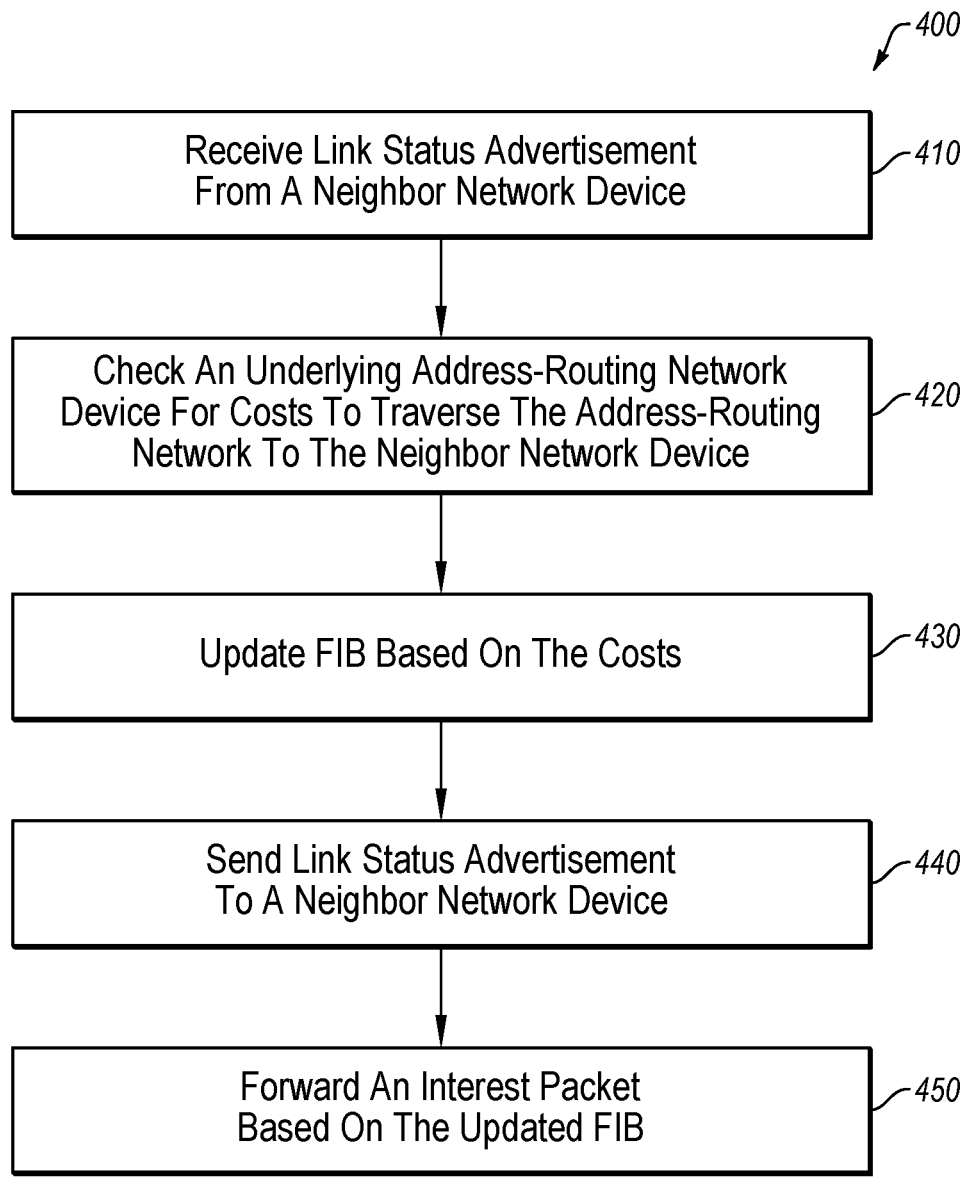
FIG. 4 is a flowchart of another example method of network-aware routing in an ICN network.

With reference to FIG. 4, at block 410, a first link status advertisement of an ICN routing protocol may be received from a neighbor network device. For example, an ICN network device (such as the ICN network device 120*a* of FIG. 1), may receive the first link status advertisement from a neighbor ICN network device (such as the ICN network device 122*a* of FIG. 1). The first link status advertisement may be formatted in accordance with any routing protocol, such as the NLSR protocol. For example, the neighbor ICN network device may transmit a message indicative of content available at the neighbor ICN network device and a cost associated with accessing that content, and/or the status of the communication link between the neighbor ICN network device and the ICN network device. For example, with reference to FIG. 1, the ICN network device 124*a* may send a link status advertisement to the ICN network device 122a indicating that it has stored or has access to the content /movie/titanic. Additionally or alternatively, the link status advertisement may indicate how many links the neighbor ICN network device has, the network device names of the neighbors of the neighbor ICN network device, and/or costs associated with communicating with the neighbors of the neighbor ICN network device. In these and other embodiments, the costs in the first link status advertisement may have been determined based on costs of traversing an underlying address-routing network (such as the IP network 160 of FIG. 1).

In some embodiments, the block 410 may be repeated for any number of neighbor ICN network devices and any number of contents. For example, with reference to FIG. 1, the ICN network device 120a may receive link status advertisement messages from both the ICN network device 122a and the ICN network device 126a, for example, related to the content /movie/titanic.

At block 420, an underlying address-routing network device may be checked for costs to traverse the address-routing network to the neighbor network device. For example, the ICN network device may submit a query to the underlying address-routing network device (such as the IP network device 120b of FIG. 1) regarding a cost to traverse the address-routing network (such as the IP network 160) when sending a packet to the neighboring ICN network device. The underlying IP network device may determine the network costs associated with traversing the IP network. For example, the IP network device may utilize an address conversion table to determine a neighboring underlying IP network device that underlies the neighboring ICN network device. The IP network device may determine the network cost to route to the neighboring underlying IP network device. For example, the IP network device 120b may determine that it is one hop to the underlying IP network device 122b by referencing a forwarding table of the IP network device 120b. Additionally or alternatively, the ICN network device may utilize an address lookup table to determine the address of the underlying address-routing network device underlying the neighboring ICN network device such that the query to the address-routing network device may include an address of another address-routing network device, rather than an ICN network device.

In some embodiments, the block 420 may be repeated for any number of link status advertisement messages. For example, with reference to FIG. 1, the ICN network device 120a may check the cost for routing from the IP network device 120b to 122b (one hop) in response to a link status advertisement message from the ICN network device 122a, and in response to another link status advertisement message from the ICN network device 126a, may check the cost for routing from the IP network device 120b to 126b (three hops, including from 120b to 122b, from 122b to 140d, and from 140d to 126b).

At block 430, an FIB of the ICN network device may be updated based on the costs of routing through the underlying IP network. For example, the FIB entry for the content /movie/titanic may be updated to reflect the cost associated with accessing the content while traversing at least portions of the underlying IP network. For example, with reference to FIG. 1, after the ICN network device 122a has received the cost information from the underlying IP network 160 in response to queries regarding the advertisement regarding /movie/content from the ICN network devices 122a and 124a, the ICN network device 120a may update its FIB entry associated with movie/titanic to show the cost through the underlying IP network, such as "movie/titanic port 1 (cost=1), port 2 (cost=2)", where the costs are based on the response to the query of the underlying IP network. For example, if the cost is one hop, the FIB may be updated to reflect that cost, or if the cost is three hops, the FIB may be updated to reflect that cost such that a path with smaller costs in the underlying address-routing network may be selected to route an interest packet. Thus, the FIB may represent routing to ICN network devices based on costs associated with the underlying address-routing network.

At block 440, a link status advertisement message may be sent to a neighbor network device. For example, with reference to FIG. 1, the ICN network device 120a may send the link status advertisement message to the ICN network device 126a. The link status advertisement message may include a similar or comparable format to the link status advertisement message of the block 410, although containing status of the links and neighbors of the ICN network device and/or the content to which the ICN network device has access, rather than receiving information regarding the neighbor ICN network device's neighbors. By using such advertisements, all the ICN network devices may manage their respective FIBs to identify the local interfaces to be used to reach particular content. Additionally, those interfaces may be ranked, ordered, or otherwise maintained based on the costs associated with the underlying address-routing network.

At block 450, an interest packet may be forwarded through the ICN network based on the updated FIB. For example, the ICN network device may receive an interest packet and may determine that the interest packet is to be routed through the ICN network. The ICN network device may check its FIB to determine where to route the interest packet, and may route the packet based on the FIB that reflects the costs of traversing the underlying address-routing network.

With reference to FIG. 4, the link status advertisement messages may be sent in a variety of circumstances. For example, an ICN network device may send a link state advertisement message in response to receiving a link state advertisement message from a neighbor ICN network device; periodically; and/or in response to events, such as content changes (e.g., a new content is added to an ICN network device) or network state change (e.g. link failure or ICN network device failure).

Figure 5:
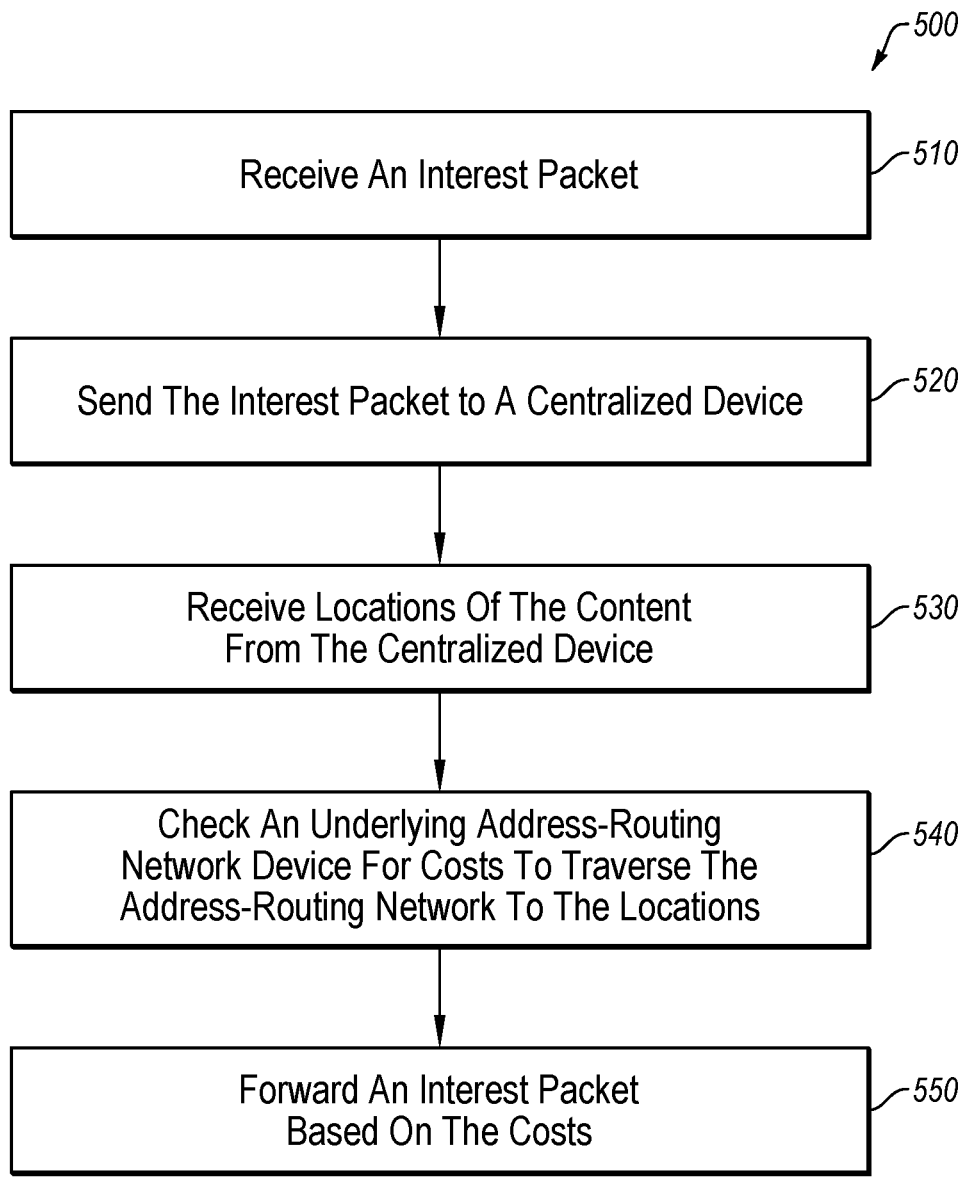
FIG. 5 is a flowchart of another example method of network-aware routing in an ICN network.

With reference to FIG. 5, at block 510, an interest packet may be received. For example, an ICN network device (such as the ICN network device 120a of FIG. 1) may receive an interest packet from an end user (such as the end user 110 of FIG. 1) over an ICN network (such as the ICN network 150 of FIG. 1). The ICN network device may determine that the interest packet is to be routed on through the ICN network (e.g., the requested content is not stored in the content store and no entry exists in the PIT for the content).

At block 520, the interest packet may be sent to a centralized device (such as the centralized device 170 of FIG. 1). For example, the ICN network device may transmit the interest packet to a DNS server or other device or system with similar or comparable functionality. For example, the centralized device may look up locations where the content may be stored. With reference to FIG. 1, the centralized device 170 may receive an interest packet for the content 130 /movie/titanic and may perform a lookup and determine that the content 130 may be stored at the ICN network devices 124a and/or 126a.

At block 530, locations of where the content is stored may be received. For example, the centralized device may transmit a message to the ICN network device with the locations of where the content is stored. For example, with reference to FIG. 1, the centralized device 170 may transmit a message to the ICN network device 120a indicating that the content 130 is stored at the ICN network devices 124a and 126a.

At block 540, an underlying address-routing network device may be checked for costs to traverse the address-routing network to the locations. For example, the ICN network device (such as the ICN network device 120a) may query its underlying address-routing network device (such as the IP network device 120b of FIG. 1) to determine the network costs of traversing the address-routing network (such as the IP network 160) when sending a packet to the locations identified by the centralized device. For example, an ICN network device may utilize an address conversion table to determine underlying address-routing network devices that underlie the locations of the ICN network devices identified by the centralized device (following the example above, the IP network devices 124b and 126b underlie the ICN network devices 124a and 126a). The ingress address-routing network device may determine the network cost to route to the other identified underlying address-routing network devices. For example, the IP network device 120b may determine that it is two hops to the underlying IP network device 124b and three hops to the underlying IP network device 126b. In some embodiments, based on a response to the check, the ICN network device may update the FIB of the ICN network device to reflect the costs associated with the various routes through the underlying address-routing network.

At block 550, the interest packet may be forwarded based on the costs. For example, the ICN network device may route the interest packet on through the ICN network based on the updated FIB.

Figure 6:
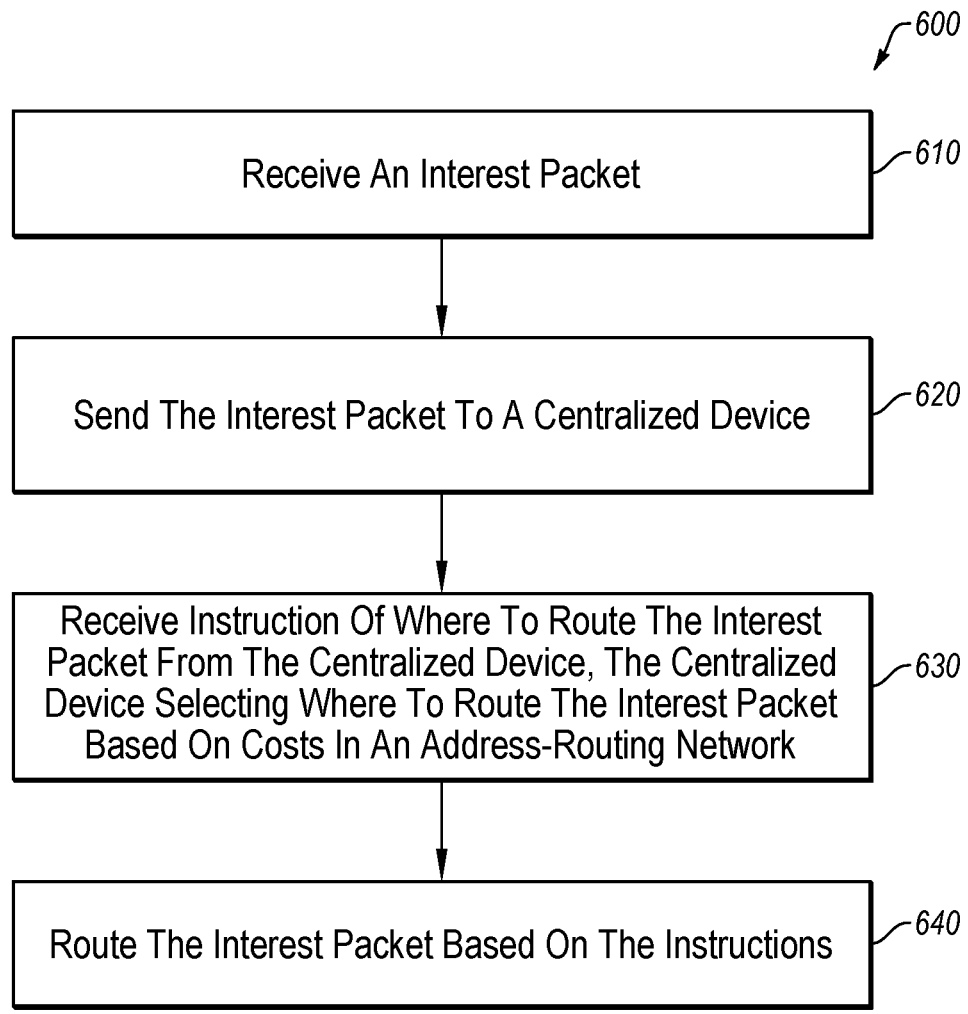
FIG. 6 is a flowchart of another example method of network-aware routing in an ICN network.

With reference to FIG. 6, at block 610, an interest packet may be received. For example, an ICN network device (such as the ICN network device 120a of FIG. 1) may receive an interest packet from an end user (such as the end user 110 of FIG. 1). The block 610 may be similar or comparable to the block 510 of FIG. 5.

At block 620, the interest packet may be sent to a centralized device. For example, the ICN network device may transmit the interest packet to the centralized device (such as the centralized device 170). The centralized device may be an SDN controller or other device or system with similar or comparable functionality, and may store information regarding the topology of an ICN network (such as the ICN network 150 of FIG. 1) and an underlying address-routing network (such as the IP network 160 of FIG. 1). Additionally or alternatively, the SDN controller may store information regarding where content may be stored. In some embodiments, if an SDN controller covers more than one domain, an initial SDN controller that receives the interest packet may send further queries to other SDN controllers in other domains and/or to further centralized devices with knowledge of all domains.

In some embodiments, in response to receiving the interest packet, the centralized device may determine where the content is stored in the ICN network. Additionally or alternatively, the centralized device may analyze the topology of the underlying address-routing network and/or the ICN network in light of the location of the stored content. The centralized device may additionally determine a low cost path along which the ICN network device may route the interest packet to receive the content in an efficient manner in light of the topology of the address-routing network. The centralized device may transmit a message with instructions to the ICN network device regarding routing of the interest packet through the ICN network.

At block 630, the ICN network device may receive instructions of where to route the interest packet from the centralized device. In these and other embodiments, the instructions may be selected based on the costs of the various paths through the underlying address-routing network. For example, the instructions may indicate a given interface through which the ICN network device is to route the interest packet. As another example, the instructions may include updates to the FIB that are to be applied.

At block 640, the ICN network device may route the interest packet based on the instructions. For example, if the instructions include a specific interface, the ICN network device may send the interest packet to the identified interface. As another example, if the instructions include updates to the FIB, the ICN network device may update the FIB and route the interest packet based on the updated FIB.

Figure 7:
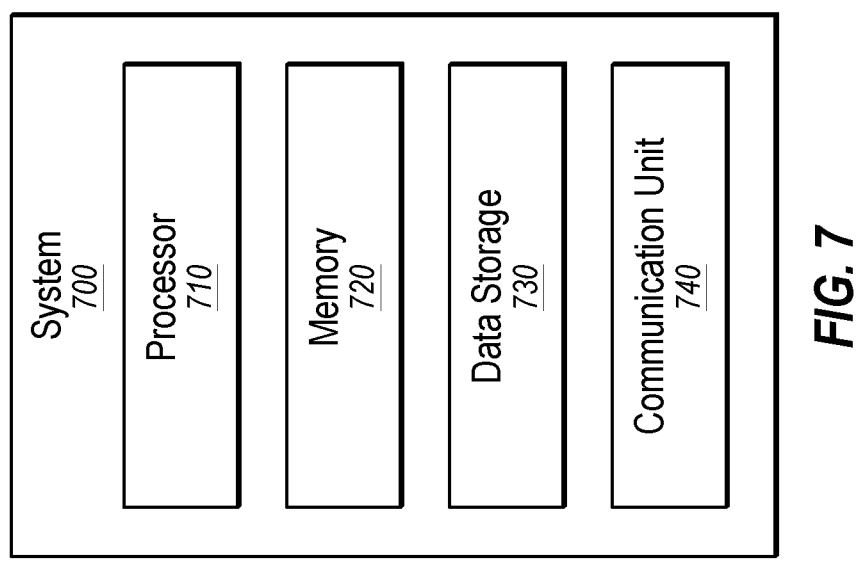
FIG. 7 is a diagram of an example computing system.

FIG. 7 illustrates an example computing system 700, according to at least one embodiment described in the present disclosure. Any of the devices of the present disclosure, including the end user 110, the ICN network devices 120a, 122a, 124a, 126a, the IP network devices 120b, 122b, 124b, 126b, the IP network devices 140a, 140b, 140c, 140d, and/or the centralized device 170 may be implemented as the computing system 700.

The system 700 may include any suitable system, apparatus, or device configured to communicate over a network. The computing system 700 may include a processor 710, a memory 720, a data storage 730, and a communication unit 740, which all may be communicatively coupled. The data storage 730 may include various types of data, such as a content store, an FIB, a PIT, or others.

Generally, the processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 7, it is understood that the processor 710 may include any number of processors distributed across any number of network or physical locations that are configured to perform individually or collectively any number of operations described in the present disclosure. In some embodiments, the processor 710 may interpret and/or execute program instructions and/or process data stored in the memory 720, the data storage 730, or the memory 720 and the data storage 730. In some embodiments, the processor 710 may fetch program instructions from the data storage 730 and load the program instructions into the memory 720.

After the program instructions are loaded into the memory 720, the processor 710 may execute the program instructions, such as instructions to perform the methods 300, 400, 500, and/or 600 of FIGS. 3-6, respectively. For example, the processor 710 may obtain instructions regarding determining network costs in an address-routing network, routing packets in an ICN network based on the address-routing network costs, and/or others.

The memory 720 and the data storage 730 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 710. In some embodiments, the computing system 700 may or may not include either of the memory 720 and the data storage 730.

By way of example, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

The communication unit 740 may include any component, device, system, or combination thereof that is configured to transmit or receive information over a network. In some embodiments, the communication unit 740 may communicate with other devices at other locations, the same location, or even other components within the same system. For example, the communication unit 740 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 740 may permit data to be exchanged with a network and/or any other devices or systems described in the present disclosure. For example, the communication unit 740 may allow the system 700 to communicate with other systems, such as computing devices and/or other networks.

Modifications, additions, or omissions may be made to the system 700 without departing from the scope of the present disclosure. For example, the data storage 730 may include multiple different storage mediums located in multiple locations and accessed by the processor 710 through a network.

As indicated above, the embodiments described in the present disclosure may include the use of a special purpose or general purpose computer (e.g., the processor 710 of FIG. 7) including various computer hardware or software modules, as discussed in greater detail below. Further, as indicated above, embodiments described in the present disclosure may be implemented using computer-readable media (e.g., the memory 720 or data storage 730 of FIG. 7) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, and/or others) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of routing packets, the method comprising:
receiving, at a network device, an interest packet that requests content from an information centric networking (ICN) network, the network device configured to communicate in the ICN network via one or more paths in an underlying address-routing network, the ICN network overlaid on one or more network devices communicating in the underlying address-routing network;
determining, between a first and second alternative path, a routing path of where to route the interest packet based on network costs associated with obtaining the content along each of the first and the second alternative paths through the underlying address-routing network; and
sending the interest packet along the routing path.

2. The method of claim 1, wherein determining a routing path includes:
receiving, by the network device, a first link status advertisement from a first neighboring network device in the ICN network along the first alternative path;
determining, in response to receiving the first link status advertisement, a first network cost to traverse at least a portion of the first alternative path through the underlying address-routing network to where the first neighboring network device overlays the underlying address-routing network;
receiving, by the network device, a second link status advertisement from a second neighboring network device in the ICN network along the second alternative path;
determining, in response to receiving the second link status advertisement, a second network cost to traverse at least a portion of the second alternative path through the underlying address-routing network to where the second neighboring network device overlays the underlying address-routing network;
determining the routing path based on whether the first network cost or the second network cost is lower; and
updating a forwarding information base (FIB) of the network device with the routing path, the FIB associated with the ICN network,
wherein sending the interest packet is performed based on the FIB.

3. The method of claim 2, wherein determining the first network cost includes determining the first network cost based on a forwarding table of the network device, the forwarding table including information regarding the underlying address-routing network.

4. The method of claim 1, further comprising:
querying a centralized device regarding locations of the content; and
receiving a first location associated with the first alternative path and a second location associated with the second alternative path where the content is stored.

5. The method of claim 4, wherein determining a routing path includes:
determining a first network cost to traverse at least a portion of the first alternative path through the underlying address-routing network to the first location;
determining a second network cost to traverse at least a portion of the second alternative path through the underlying address-routing network to the second location; and
determining the routing path based on whether the first network cost or the second network cost is lower.

6. The method of claim 1, wherein determining a routing path includes:
querying a centralized device regarding locations of the content, the centralized device storing the network costs associated with obtaining the content along each of the first and the second alternative paths; and
receiving the routing path from the centralized device.

7. The method of claim 1, further comprising operating a virtual network device on the network device, the virtual network device configured to communicate in the ICN network.

8. A non-transitory computer readable medium containing instructions that, when executed by one or more processors, cause a network device to perform or control performance of operations, the operations comprising:
receiving an interest packet that requests content from an information centric networking (ICN) network, the network device configured to communicate in the ICN network via one or more paths in an underlying address-routing network, the ICN network overlaid on one or more network devices communicating in the underlying address-routing network;
determining, between a first and second alternative path, a routing path of where to route the interest packet based on network costs associated with obtaining the content along each of the first and the second alternative paths through the underlying address-routing network; and
sending the interest packet along the routing path.

9. The computer readable medium of claim 8, wherein determining a routing path includes:
receiving a first link status advertisement from a first neighboring network device in the ICN network along the first alternative path;
determining, in response to receiving the first link status advertisement, a first network cost to traverse at least a portion of the first alternative path through the underlying address-routing network to where the first neighboring network device overlays the underlying address-routing network;
receiving a second link status advertisement from a second neighboring network device in the ICN network along the second alternative path;
determining, in response to receiving the second link status advertisement, a second network cost to traverse at least a portion of the second alternative path through the underlying address-routing network to where the second neighboring network device overlays the underlying address-routing network;
determining the routing path based on whether the first network cost or the second network cost is lower; and
updating a forwarding information base (FIB) of the network device with the routing path, the FIB associated with the ICN network,
wherein sending the interest packet is performed based on the FIB.

10. The computer readable medium of claim 9, wherein determining the first network cost includes determining the first network cost based on a forwarding table of the network device, the forwarding table including information regarding the underlying address-routing network.

11. The computer readable medium of claim 8, wherein the operations further comprise:
querying a centralized device regarding locations of the content; and receiving a first location associated with the first alternative path and a second location associated with the second alternative path where the content is stored.

12. The computer readable medium of claim 11, wherein determining a routing path includes:
   determining a first network cost to traverse at least a portion of the first alternative path through the underlying address-routing network to the first location;
   determining a second network cost to traverse at least a portion of the second alternative path through the underlying address-routing network to the second location; and
   determining the routing path based on whether the first network cost or the second network cost is lower.

13. The computer readable medium of claim 8, wherein determining a routing path includes:
   querying a centralized device regarding locations of the content, the centralized device storing the network costs associated with obtaining the content along each of the first and the second alternative paths; and
   receiving the routing path from the centralized device.

14. The computer readable medium of claim 8, wherein the operations further comprise operating a virtual network device on the network device, the virtual network device configured to communicate in the ICN network.

15. A network device, comprising:
   one or more processors; and
   one or more non-transitory computer readable media containing instructions that, when executed by the one or more processors, cause the network device to perform or control performance of operations, the operations comprising:
   receiving an interest packet that requests content from an information centric networking (ICN) network, the network device configured to communicate in the ICN network via one or more paths in an underlying address-routing network, the ICN network overlaid on one or more network devices communicating in the underlying address-routing network;
   determining, between a first and second alternative path, a routing path of where to route the interest packet based on network costs associated with obtaining the content along each of the first and the second alternative paths through the underlying address-routing network; and
   sending the interest packet along the routing path.

16. The network device of claim 15, wherein determining a routing path includes:
   receiving a first link status advertisement from a first neighboring network device in the ICN network along the first alternative path;
   determining, in response to receiving the first link status advertisement, a first network cost to traverse at least a portion of the first alternative path through the underlying address-routing network to where the first neighboring network device overlays the underlying address-routing network;
   receiving a second link status advertisement from a second neighboring network device in the ICN network along the second alternative path;
   determining, in response to receiving the second link status advertisement, a second network cost to traverse at least a portion of the second alternative path through the underlying address-routing network to where the second neighboring network device overlays the underlying address-routing network;
   determining the routing path based on whether the first network cost or the second network cost is lower; and
   updating a forwarding information base (FIB) of the network device with the routing path, the FIB associated with the ICN network,
   wherein sending the interest packet is performed based on the FIB.

17. The network device of claim 16, wherein determining the first network cost includes determining the first network cost based on a forwarding table of the network device, the forwarding table including information regarding the underlying address-routing network.

18. The network device of claim 15, wherein the operations further comprise:
   querying a centralized device regarding locations of the content; and
   receiving a first location associated with the first alternative path and a second location associated with the second alternative path where the content is stored.

19. The network device of claim 18, wherein determining a routing path includes:
   determining a first network cost to traverse at least a portion of the first alternative path through the underlying address-routing network to the first location;
   determining a second network cost to traverse at least a portion of the second alternative path through the underlying address-routing network to the second location; and
   determining the routing path based on whether the first network cost or the second network cost is lower, and
   wherein determining a routing path includes:
      querying a centralized device regarding locations of the content, the centralized device storing the network costs associated with obtaining the content along each of the first and the second alternative paths; and
      receiving the routing path from the centralized device.

20. The network device of claim 15, wherein the operations further comprise operating a virtual network device on the network device, the virtual network device configured to communicate in the ICN network.

* * * * *